US011952962B1

(12) United States Patent
Akcayoz et al.

(10) Patent No.: US 11,952,962 B1
(45) Date of Patent: Apr. 9, 2024

(54) EXHAUST DUCT FOR GAS TURBINE ENGINE

(71) Applicant: Pratt & Whitney Canada Corp., Longueuil (CA)

(72) Inventors: Eray Akcayoz, Cote-Saint-Luc (CA); Mark Cunningham, Montreal-Ouest (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/162,269

(22) Filed: Jan. 31, 2023

(51) Int. Cl.
*F02K 1/40* (2006.01)

(52) U.S. Cl.
CPC .......... *F02K 1/40* (2013.01); *F05D 2220/323* (2013.01); *F05D 2250/51* (2013.01); *F05D 2250/52* (2013.01); *F05D 2250/71* (2013.01); *F05D 2250/73* (2013.01)

(58) Field of Classification Search
CPC .. F02K 1/40; F05D 2220/323; F05D 2250/51; F05D 2250/52; F05D 2250/71; F05D 2250/73
See application file for complete search history.

(56) References Cited

U.S. PATENT DOCUMENTS

| 3,981,448 | A | * | 9/1976 | Demogenes | F02K 1/822 60/770 |
| 6,290,173 | B1 | * | 9/2001 | Nickels | B64D 33/04 244/129.1 |
| 7,681,400 | B2 | * | 3/2010 | Daris | F02K 1/40 60/770 |
| 9,969,500 | B2 | | 5/2018 | Anderson et al. | |
| 10,514,003 | B2 | * | 12/2019 | Akcayoz | F01D 25/30 |
| 11,199,108 | B2 | | 12/2021 | Ferrier et al. | |
| 11,319,897 | B2 | | 5/2022 | Joo et al. | |
| 2006/0027679 | A1 | * | 2/2006 | Gratteau | F02K 1/40 239/548 |
| 2009/0001216 | A1 | * | 1/2009 | Kirstein | B64C 29/0066 244/12.5 |
| 2010/0199626 | A1 | * | 8/2010 | Harding | F02K 1/386 60/39.5 |
| 2011/0200421 | A1 | * | 8/2011 | Gallier | F01D 25/30 415/211.2 |
| 2015/0218967 | A1 | * | 8/2015 | Anderson | F01D 25/30 137/561 A |
| 2018/0363588 | A1 | * | 12/2018 | Iglewski | B64D 33/04 |

FOREIGN PATENT DOCUMENTS

| CN | 109715907 A | 5/2019 |
| CN | 114233513 A | 3/2022 |
| EP | 3418195 B1 | 10/2021 |

* cited by examiner

Primary Examiner — Jesse S Bogue
(74) Attorney, Agent, or Firm — CANTOR COLBURN LLP

(57) ABSTRACT

An exhaust duct of an aircraft engine includes an annular inlet conduit having an inlet central axis, and at least two outlet conduits in flow communication with the inlet conduit. The at least two outlet conduits are located non-parallel to the inlet central axis. Each of the at least two outlet conduits include an outlet port defining a distal end of each of the two outlet conduits. At least one of the outlet ports is non-circular in cross-sectional shape.

14 Claims, 3 Drawing Sheets

EXHAUST DUCT FOR GAS TURBINE ENGINE

BACKGROUND

Exemplary embodiments pertain to the art of gas turbine engines, and more particularly to exhaust ducts of gas turbine engines.

In gas turbine engines, exhaust ducts are disposed downstream of a turbine section to evacuate combustion products utilized to drive a turbine of the turbine section. The flow of gases entering the exhaust ducts may be swirling and have a substantial velocity, which may be used as a residual thrust to the engine. Swirling of the gases may produce total pressure loss, which in turn may reduce the residual thrust available. Typically, the exhaust exit duct exit has a circular shape to keep manufacturing process simple for exhaust and for ease of mating of a stub duct installed by an aircraft manufacturer at the exit of the exhaust duct to direct flow and to control the area for a specific design condition.

BRIEF DESCRIPTION

In one embodiment, an exhaust duct of an aircraft engine includes an annular inlet conduit having an inlet central axis, and at least two outlet conduits in flow communication with the inlet conduit. The at least two outlet conduits are located non-parallel to the inlet central axis. Each of the at least two outlet conduits include an outlet port defining a distal end of each of the two outlet conduits. At least one of the outlet ports is non-circular in cross-sectional shape.

Additionally or alternatively, in this or other embodiments the at least one outlet port is elliptical in cross-sectional shape.

Additionally or alternatively, in this or other embodiments a major axis of the elliptical cross-sectional shape extends in a direction perpendicular to the inlet central axis.

Additionally or alternatively, in this or other embodiments a major axis of the elliptical cross-sectional shape extends in a direction along the inlet central axis direction.

Additionally or alternatively, in this or other embodiments an aspect ratio of the major axis to a minor axis of the elliptical cross-sectional shape is between 1 and 2.

Additionally or alternatively, in this or other embodiments each of the outlet conduits extend curvilinearly from an intersection of the outlet conduits and the inlet conduit.

Additionally or alternatively, in this or other embodiments a cross-sectional area of the outlet conduits varies between the outlet port and an intersection of the outlet conduits and the inlet conduit.

Additionally or alternatively, in this or other embodiments the inlet conduit includes a central bore to accommodate a shaft of the gas turbine engine therein.

Additionally or alternatively, in this or other embodiments the at least two outlet conduits are two outlet conduits located 180 degrees apart relative to the inlet central axis.

In another embodiment, a propulsion system of an aircraft includes a gas turbine engine having a combustor to combust a mixture of fuel and air and a turbine driven by a flow of combustion gases about an engine central axis. The propulsion system further includes an exhaust nozzle to receive combustion gases from the turbine and exhaust the combustion gases. The exhaust nozzle includes an annular inlet conduit extending along the engine central axis, and at least two outlet conduits in flow communication with the inlet conduit. The at least two outlet conduits are located non-parallel to the engine central axis. Each of the at least two outlet conduits include an outlet port defining a distal end of each of the two outlet conduits. At least one of the outlet ports is non-circular in cross-sectional shape.

Additionally or alternatively, in this or other embodiments the at least one outlet port is elliptical in cross-sectional shape.

Additionally or alternatively, in this or other embodiments a major axis of the elliptical cross-sectional shape extends in a direction perpendicular to the engine central axis.

Additionally or alternatively, in this or other embodiments a major axis of the elliptical cross-sectional shape extends in a direction along the engine central axis direction.

Additionally or alternatively, in this or other embodiments an aspect ratio of the major axis to a minor axis of the elliptical cross-sectional shape is between 1 and 2.

Additionally or alternatively, in this or other embodiments each of the outlet conduits extend curvilinearly from an intersection of the outlet conduits and the inlet conduit.

Additionally or alternatively, in this or other embodiments wherein a cross-sectional area of the outlet conduits varies between the outlet port and an intersection of the outlet conduits and the inlet conduit.

Additionally or alternatively, in this or other embodiments the inlet conduit includes a central bore to accommodate a shaft of the gas turbine engine therein.

Additionally or alternatively, in this or other embodiments the shaft drives a propeller of the aircraft.

Additionally or alternatively, in this or other embodiments the exhaust duct is located between the propeller and the turbine, relative to the engine central axis.

Additionally or alternatively, in this or other embodiments the at least two outlet conduits are two outlet conduits located 180 degrees apart relative to the engine central axis.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
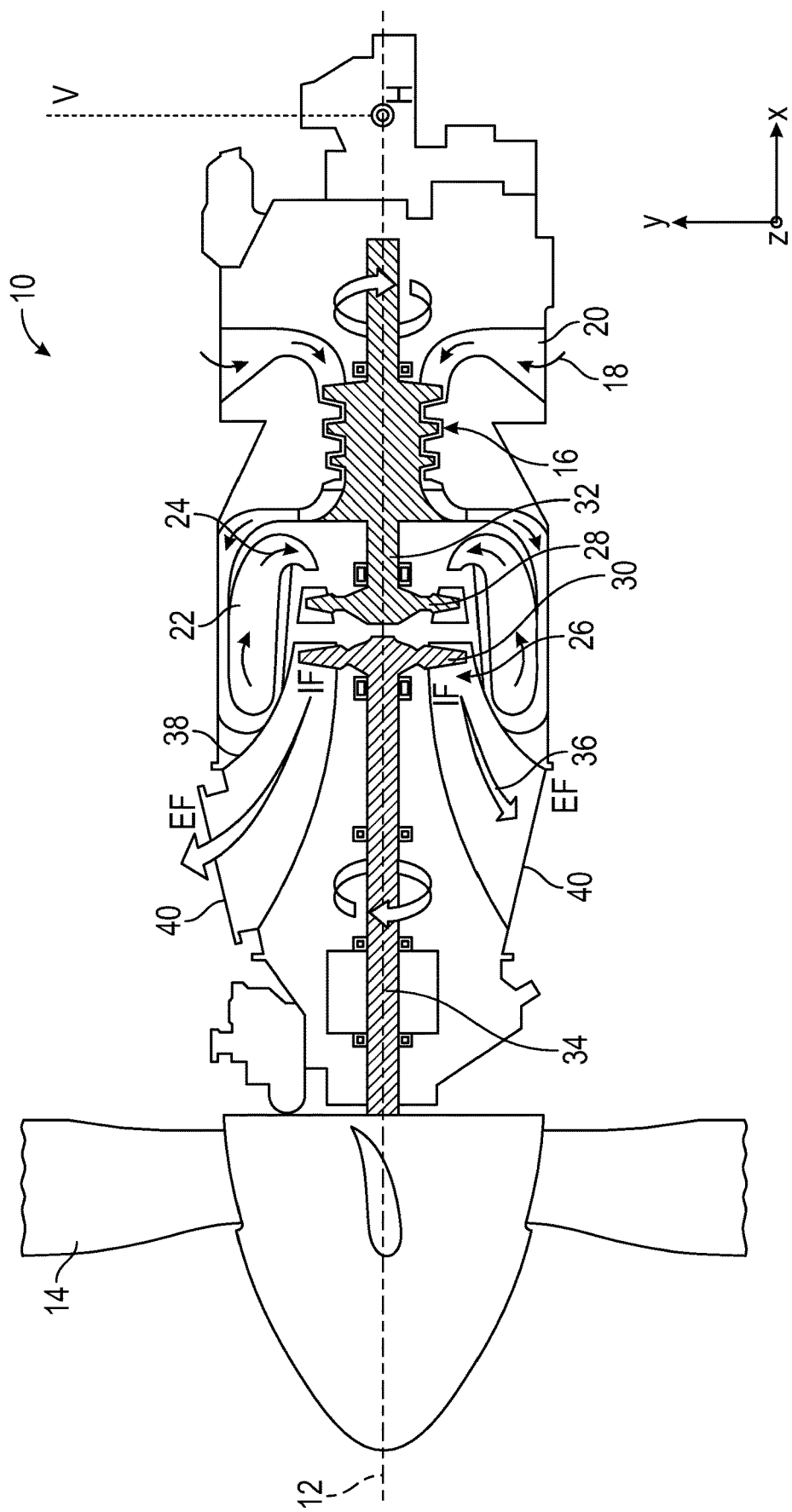
FIG. 1 is a schematic cross-sectional illustration of an embodiment of a gas turbine engine.

FIG. 1 illustrates an embodiment of a gas turbine engine 10, in this example a turboprop engine, of a type provided for use in subsonic flight, generally comprising serial flow communication along an engine central axis 12, parallel to the X-axis of the orthogonal axes illustrated in FIG. 1. The gas turbine engine 10 includes a propeller 14 through which ambient air is propelled, a compressor section 16 that receives an airflow 18 through an airflow inlet 20, and a combustor 22 in which the compressed airflow is mixed with a flow of fuel and combusted. The operation of the combustor 22 produces a stream of combustion gases 24, which flow through a turbine section 26, which includes one or more turbines, one of which may be a compressor-drive turbine 28 and another which may be a propeller-drive turbine 30.

The compressor-drive turbine 28 is operably connected to the compressor 16 via a compressor shaft 32 located at the engine central axis 12 to rotationally drive the compressor 16 about the engine central axis 12 via rotation of the compressor-drive turbine 28. Similarly, the propeller-drive turbine 30 is operably connected to the propeller 14 via a propeller shaft 34 located at the engine central axis 12 to rotationally drive the propeller 14 about the engine central axis 12, via rotation of the propeller-drive turbine 30. In some embodiments, the compressor-drive turbine 28 is located upstream of the propeller-drive turbine 30 relative to a general direction of flow of the combustion gases 24 through the turbine section 26. Exhaust gases 36 from the turbine section 26 are expelled from the gas turbine engine 10 via an exhaust duct 38. The direction of flow of the exhaust gases 36 in the exhaust duct 38 are illustrated by arrows IF and EF, indicated incoming flow and outgoing flow, respectively, relative to the exhaust duct 38.

Figure 2:
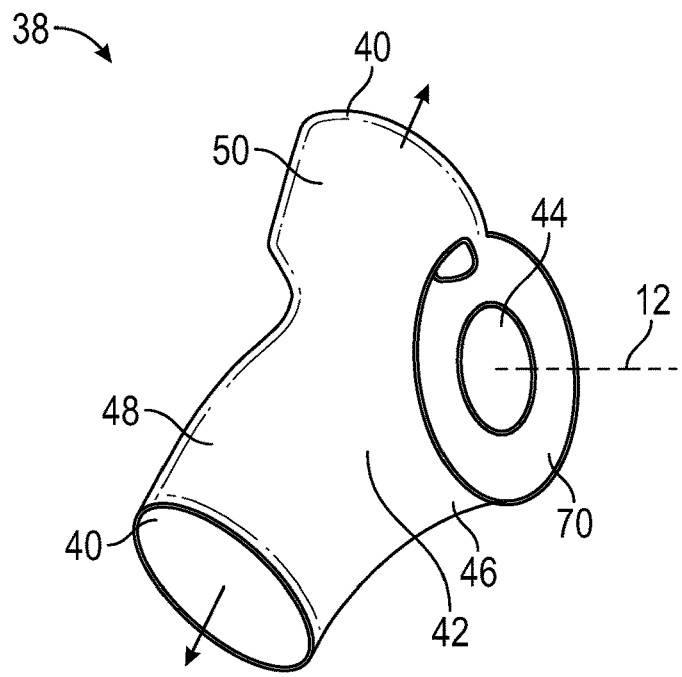
FIG. 2 is a perspective view of an embodiment of an outlet duct.
Figure 3:
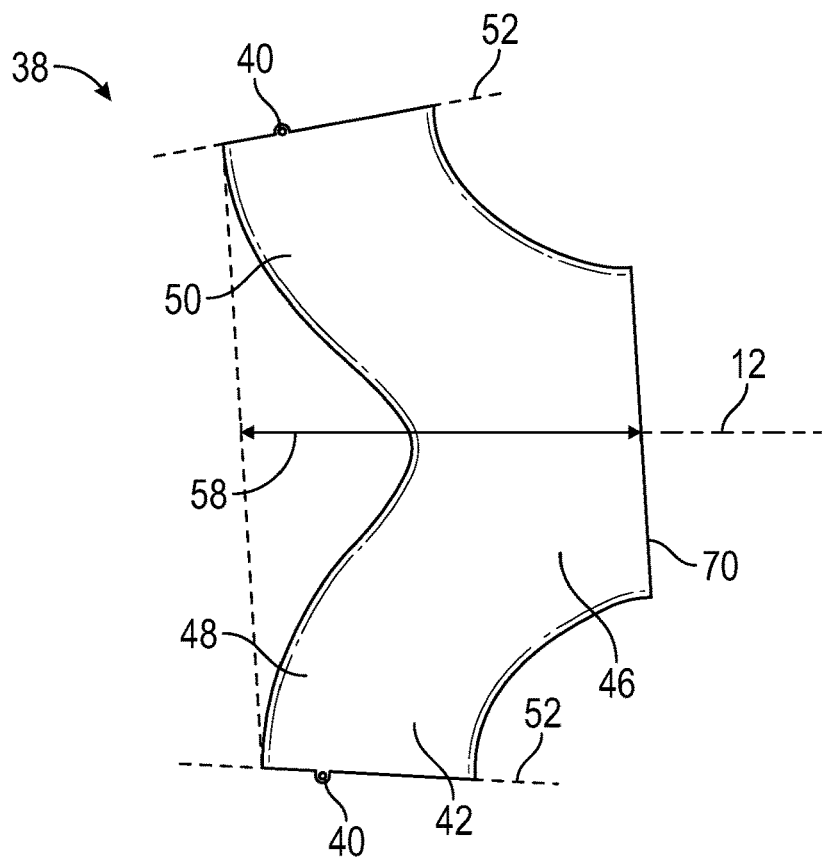
FIG. 3 is a plan view of an embodiment of an outlet duct.

Referring to FIGS. 2 and 3, the exhaust duct 38, in this embodiment a dual exhaust port 40 exhaust duct is formed by a generally Y-shaped body 42. The body 42 is annular and defines a fluid flow passage about a central bore 44, which accommodates the propeller shaft 34 therethrough. The fluid flow passage of the body 42 generally includes an inlet conduit 46 through which the central bore 44 extends, and in this example, two outlet conduits 48, 50 branching off from the inlet conduit 46. One skilled in the art will readily appreciate that the inlet conduit 46 and the outlet conduits 48, 50 may adopt various configurations. For example, they can take the form of cylindrically straight or curved conduits. In some embodiments, the body 42 may include more than two outlet conduits 48. The inlet conduit 46 may be provided in the form annular inlet conduit 70 where the inlet conduit 46 and the outlet conduits 48, 50 connect and communicate. In some embodiments, the inlet conduit 46 has a circular cross-section and is coaxial with the engine central axis 12. In some embodiments the outlet conduits 48, 50 are positioned perpendicularly to the inlet conduit 46, extending radially relative to the inlet conduit 46 and defining a substantially T-shaped body 42. In other embodiments, the outlet conduits 48, 50 are positioned non-perpendicularly to the inlet conduit 46, extending both radially and axially relative to the inlet conduit 46 and defining a substantially Y-shaped body 42.

Figure 4:
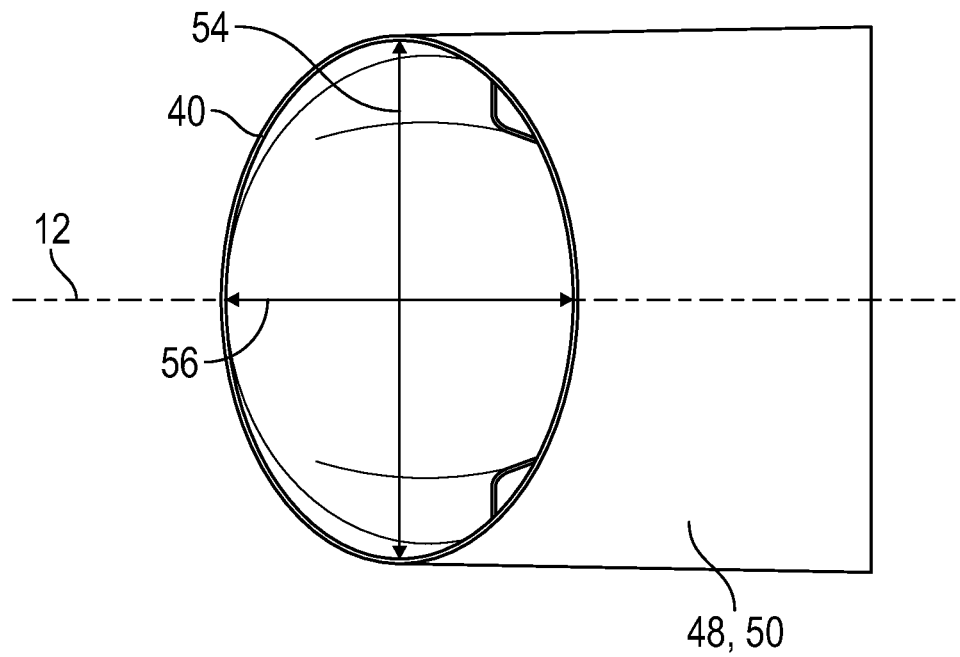
FIG. 4 is an end view of an embodiment of an outlet port of an outlet duct.

Referring to FIG. 3, the outlet conduits 48, 50 each include an outlet port through which the exhaust gases 36 are expelled from the exhaust duct 38. The outlet ports 40 are openings defined in an exit plane 52 of each of the outlet conduits 48, 50. The exit plane 52 is the distal end of each of the outlet conduits 48, 50. At least one of the outlet ports 40 has a non-circular cross-section in the exit plane 52. In some embodiments, the non-circular cross-section is elliptical, but other non-circular cross-sections are contemplated within the scope of the present disclosure, such as oval, rounded polygonal or the like. As shown in FIG. 4, the non-circular shape has a major axis 54 and a minor axis 56, such that the aspect ratio of the major axis 54 to the minor axis 56 is greater than 1. In some embodiments the aspect ratio as greater than 1.5 or 2. The area and the shape of the elliptical cross-section is selected to provide a selected exhaust performance while fitting the exhaust duct 38 into a desired volumetric envelope, including satisfying requirements for length of the exhaust duct 38 along the engine central axis 12 and height of the exhaust duct 38 in a direction perpendicular to the engine central axis 12.

Figure 5:
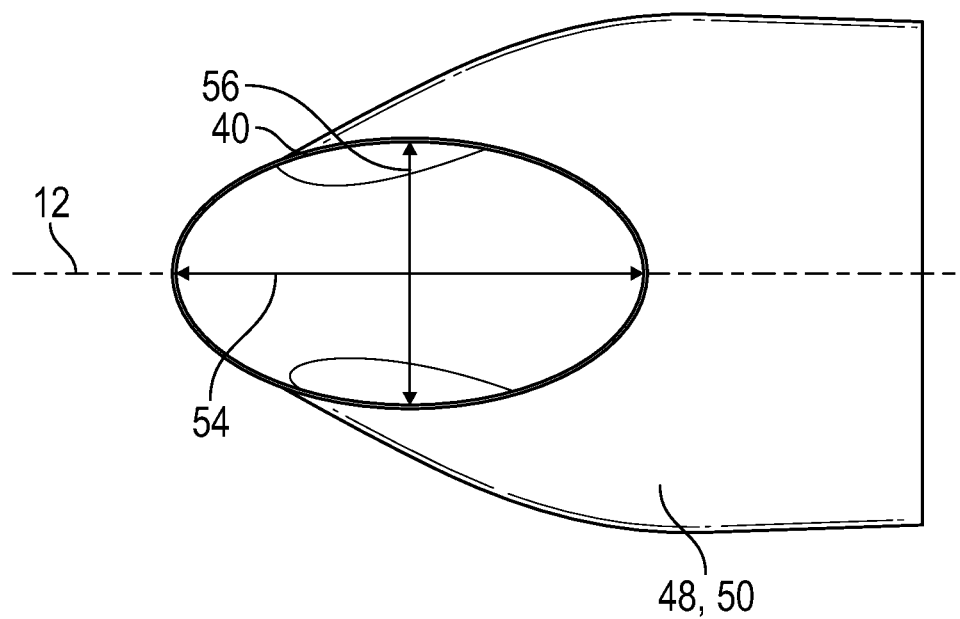
FIG. 5 is an end view of another embodiment of an outlet port of an outlet duct.

In some embodiments the outlet ports 40 are elliptical, with the major axis 54 of the elliptical shape perpendicular to the engine central axis 12. This reduces an overall duct length 58 of the exhaust duct 38 in a direction parallel to the engine central axis 12, when compared to an outlet duct having a circular outlet port of equal area. Alternatively, in other embodiments, such as illustrated in FIG. 5, the major axis 54 is located parallel to the engine central axis 12. While in the embodiments illustrated herein the major axis 54 is located either perpendicular to or parallel to the engine central axis 12, in other embodiments the major axis 54 may have an orientation that is neither perpendicular to nor parallel to the engine central axis 12. The improved compactness of the exhaust ducts 38 due to the non-circular outlet conducts 48, 50 allows for the exhaust duct 38 to be packaged into a space having a smaller axial length and/or a reduced height, thus saving space within a nacelle or airframe for other components.

In some embodiments, the outlet conduits 48, 50 are a constant non-circular cross-section along their entire length from their intersection with the inlet conduit 46 to the exit plane 52 of the outlet port 40. In other embodiments, however, the cross-sectional shape of the outlet conduits 48, 50 may vary. For example, in some embodiments the outlet conduits 48, 50 may have a circular cross-section at their intersection with the inlet conduit 46 and may transition to the elliptical or other non-circular cross-sectional shape at the outlet plane 52. Further, in some embodiments the outlet conduits 48, 50 extend along a linear central axis, such that the outlet conduits 48, 50 are "straight". In other embodiments, such as illustrated herein, the outlet conduits 48, 50 follow a curvilinear path along their length from their intersection with the inlet conduit 46 to the outlet plane 52.

The exhaust ducts 38 described and illustrated herein allow for fitting the exhaust ducts 38 and their outlet ports 40 into tight volumetric envelopes while still achieving a desired cross-sectional area of the outlet ports 40 to achieve a desired performance of the exhaust duct 38.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An exhaust duct of an aircraft engine, comprising:
an annular inlet conduit having an inlet central axis; and
at least two outlet conduits in flow communication with the inlet conduit, the at least two outlet conduits located non-parallel to the inlet central axis;
wherein each of the at least two outlet conduits include an outlet port defining a distal end of each of the two outlet conduits; and
wherein at least one of the outlet ports is non-circular in cross-sectional shape;
wherein the at least one outlet port is elliptical in cross-sectional shape; and
wherein a major axis of the elliptical cross-sectional shape extends in a direction perpendicular to the inlet central axis.

2. The exhaust duct of claim 1, wherein an aspect ratio of the major axis to a minor axis of the elliptical cross-sectional shape is between 1 and 2.

3. The exhaust duct of claim 1, wherein each of the outlet conduits extend curvilinearly from an intersection of the outlet conduits and the inlet conduit.

4. The exhaust duct of claim 1, wherein a cross-sectional area of the outlet conduits taken perpendicular to a lengthwise direction of the outlet conduits varies between the outlet port and an intersection of the outlet conduits and the inlet conduit.

5. The exhaust duct of claim 1, wherein the inlet conduit includes a central bore to accommodate a shaft of the aircraft engine therein.

6. The exhaust duct of claim 1, wherein the at least two outlet conduits are two outlet conduits located 180 degrees apart relative to the inlet central axis.

7. A propulsion system of an aircraft, comprising:
a gas turbine engine, including:
a combustor to combust a mixture of fuel and air; and
a turbine driven by a flow of combustion gases about an engine central axis; and
an exhaust nozzle to receive combustion gases from the turbine and exhaust the combustion gases; the exhaust nozzle including:
an annular inlet conduit extending along the engine central axis
at least two outlet conduits in flow communication with the inlet conduit, the at least two outlet conduits located non-parallel to the engine central axis;
wherein each of the at least two outlet conduits include an outlet port defining a distal end of each of the two outlet conduits; and
wherein at least one of the outlet ports is non-circular in cross-sectional shape;
wherein the at least one outlet port is elliptical in cross-sectional shape; and
wherein a major axis of the elliptical cross-sectional shape extends in a direction perpendicular to the engine central axis.

8. The propulsion system of claim 7, wherein an aspect ratio of the major axis to a minor axis of the elliptical cross-sectional shape is between 1 and 2.

9. The propulsion system of claim 7, wherein each of the outlet conduits extend curvilinearly from an intersection of the outlet conduits and the inlet conduit.

10. The propulsion system of claim 7, wherein a cross-sectional area of the outlet conduits taken perpendicular to a lengthwise direction of the outlet conduits varies between the outlet port and an intersection of the outlet conduits and the inlet conduit.

11. The propulsion system of claim 7, wherein the inlet conduit includes a central bore to accommodate a shaft of the gas turbine engine therein.

12. The propulsion system of claim 11, wherein the shaft drives a propeller of the aircraft.

13. The propulsion system of claim 12, wherein the exhaust duct is located between the propeller and the turbine, relative to the engine central axis.

14. The exhaust duct of claim 1, wherein the at least two outlet conduits are two outlet conduits located 180 degrees apart relative to the engine central axis.

* * * * *